US012444557B2

(12) United States Patent
Arrighetti et al.

(10) Patent No.: US 12,444,557 B2
(45) Date of Patent: Oct. 14, 2025

(54) LOW VOLTAGE SWITCH POLE

(71) Applicant: ABB S.p.A., Milan (IT)

(72) Inventors: Pierantonio Arrighetti, Bossico (IT); Michele Ceroni, Bedulita (IT)

(73) Assignee: ABB S.p.A., Milan (IT)

( * ) Notice: Subject to any disclaimer, the term of this patent is extended or adjusted under 35 U.S.C. 154(b) by 177 days.

(21) Appl. No.: 18/455,430

(22) Filed: Aug. 24, 2023

(65) Prior Publication Data

US 2024/0079191 A1 Mar. 7, 2024

(30) Foreign Application Priority Data

Sep. 6, 2022 (EP) .................................... 22194109

(51) Int. Cl.
*H01H 3/08* (2006.01)
*H01H 33/08* (2006.01)
*H01H 33/53* (2006.01)

(52) U.S. Cl.
CPC ............ *H01H 33/08* (2013.01); *H01H 33/53* (2013.01)

(58) Field of Classification Search
CPC .. H01H 33/08; H01H 33/53; H01H 33/66207; H01H 3/46; H01H 9/346; H01H 9/343; H01H 9/342; H01H 9/34; H01H 9/362; H01H 9/36; H01H 9/46; H01H 2009/348
USPC ....... 218/146, 15–17, 30, 31, 34–36, 38, 46, 218/51, 81, 99, 103, 105
See application file for complete search history.

(56) References Cited

U.S. PATENT DOCUMENTS 5,731,561 A * 3/1998 Manthe .................. H01H 9/342 218/35
6,417,474 B1 * 7/2002 Rakus ...................... H01H 9/46 218/148
7,495,190 B2 * 2/2009 Kuhrt ....................... H01H 9/36 218/15

(Continued)

FOREIGN PATENT DOCUMENTS

DE 1690463 B1 10/1971
EP 0028012 A1 5/1981

(Continued)

OTHER PUBLICATIONS

Canadian Office Action for Application No. 3,207,840, dated Nov. 20, 2024, 8 pages.

(Continued)

*Primary Examiner* — William A Bolton
(74) *Attorney, Agent, or Firm* — McCarter & English, LLP

(57) ABSTRACT

A switch pole for a low voltage switching device including an insulating casing defining an internal space with a contact region and an arc extinguishing region of said switch pole, a fixed contact assembly and a movable contact assembly positioned in said contact region and including, respectively, one or more fixed contacts and one or more movable contacts, which can be mutually coupled or uncoupled, and an arc chamber positioned in said arc extinguishing region and including a plurality of parallel arc-breaking plates and a terminal arc-breaking element, which includes a plate portion arranged in parallel to said arc-breaking plates and a cover of electrically insulating material coating, at least partially, a surface of said plate portion.

16 Claims, 14 Drawing Sheets

(56) References Cited

U.S. PATENT DOCUMENTS

| | | | | |
|---|---|---|---|---|
| 8,471,657 | B1 * | 6/2013 | Shea | H01H 71/12 335/201 |
| 2015/0200060 | A1 * | 7/2015 | Legendre | H01H 73/045 218/147 |
| 2016/0217950 | A1 | 7/2016 | Bresciani et al. | |
| 2019/0157028 | A1 * | 5/2019 | Rival | H01H 9/342 |

FOREIGN PATENT DOCUMENTS

| | | | |
|---|---|---|---|
| EP | 0992049 | A1 | 4/2000 |
| EP | 3557599 | A1 | 10/2019 |

OTHER PUBLICATIONS

European Extended Search Report, Application No. 22194109.9, dated Feb. 13, 2023, 8 pps.

* cited by examiner

LOW VOLTAGE SWITCH POLE

CROSS REFERENCE TO RELATED APPLICATIONS

This patent application claims the benefit and priority of European Patent Application No. 22194109.9 filed on Sep. 6, 2022, the disclosure of which is incorporated by reference herein in its entirety as part of the present application.

BACKGROUND

The present disclosure relates to a switch pole for a switching device suitable for installation in low-voltage electrical systems. The disclosure likewise relates to a switching device including one or more of said switch poles.

Low voltage switching devices, such as for example circuit breakers, disconnectors, contactors, or the like, include one or more switch poles, each including one or more fixed contacts and movable contacts that can be coupled to and uncoupled from one another.

Switching devices of the known art also include driving means designed to move the movable contacts relative to said fixed contacts, so that these electric contacts can be mutually couple or uncoupled, thereby allowing or preventing electric currents to flow along the switch poles. The driving means include, for instance, mechanisms terminating in a shaft operatively connected to said movable contacts.

As is known, during an opening maneuver of a switching device, electric arcs may arise between the electric contacts under separation of the switch poles, particularly under stress conditions (e.g., in presence of overload currents or short-circuit currents).

In order to break currents circulating along the switch poles, such arcing phenomena have to be extinguished as quickly as possible. To this aim, a switching device generally includes, for each switch pole, an arc chamber including a number of arc-breaking elements positioned near the electric contacts and designed to split possible electric arcs raising between the electric contacts.

A problem normally present in switching devices of known type consists in that an uneven distribution of electric arcs among said arc-breaking elements often occurs during the opening maneuvers of the switching device. As a result, the arc-quenching action exerted by the arc-breaking elements is not uniform and efficient.

Additionally, since electric arcs may bypass some arc-breaking regions or elements, some parts of the arc chamber may be subject to high electrical and mechanical stresses and high temperatures. These events may adversely affect the lifetime of the arc chamber and lead to an early decay of its functionalities, thereby remarkably limiting the overall performances of the switching device.

Moreover, since they are not uniformly distributed among the arc-breaking elements, electric arcs may sometime “jump” towards other conductive parts of the switch pole, which are located outside the arc-extinguishing region of the switch pole. Obviously, possibly affected components may be subject to serious damages, since they are not generally designed to bear high electric and thermal stresses.

The above-mentioned problems of the available solutions of the state of the art are even made more critical by the circumstance that, in modern electric power distribution grids, switching devices are often brought to operate to relatively high operating voltages (e.g., about 1,2-1.5 kV either AC or DC). Electric arcs with higher energy content may therefore arise between the electric contacts under separation during the opening maneuvers of the switching device.

BRIEF DESCRIPTION

Embodiments of the present disclosure provide a switch pole for low voltage switching devices, which allows overcoming or mitigating the above-mentioned shortcomings.

In particular, the present disclosure provides a switch pole, in which a more uniform and efficient operation of the arc-breaking elements of the arc chamber is ensured.

Another aspect of the present disclosure provides a switch pole, in which arcing phenomena towards parts outside the arc-extinguishing region of the switch pole are prevented or remarkably reduced.

Another aspect of the present disclosure provides a switch pole that is reliable in operation and relatively easy and cheap to manufacture at industrial level.

The above aim and purposes, as well as other purposes that will emerge clearly from the following description and attached drawings, are provided, according to the disclosure, by a switch pole for a low voltage switching device, according to the following claim 1 and the related dependent claims.

In a general definition, the switch pole, according to the disclosure includes an insulating casing, which defines an internal space including a contact region and an arc extinguishing region.

The switch pole, according to the disclosure, further includes a fixed contact assembly and a movable contact assembly positioned in the contact region of the switch pole.

The fixed contact assembly and the movable contact assembly include, respectively, one or more fixed contacts and one or more movable contacts, which can be mutually coupled or uncoupled.

The fixed contact assembly may be arranged at a rear wall of the insulating casing.

The movable contact assembly of the switch pole may be reversibly movable between a first position, in which said movable contacts are coupled to said fixed contacts, and a second position, in which said movable contacts are spaced apart from said fixed contacts.

The switch pole, according to the present disclosure, further includes an arc chamber positioned in the arc extinguishing region of the switch pole.

The arc chamber includes a plurality of arc-breaking elements, which include a plurality of parallel arc-breaking plates and a terminal arc-breaking element.

The arc chamber may include an insulating enclosure that can be removably fixed to the outer insulating casing of the switch pole. Advantageously, the arc-breaking elements of the arc chamber are fixed to said insulating enclosure.

The arc-breaking plates may be arranged at subsequent positions between a front wall and a rear wall of the insulating casing. In this way, they can split possible electric arcs passing through them.

The arc-breaking plates may be formed by metallic or ceramic plates.

The terminal arc-breaking element is instead arranged in distal position from the above-mentioned fixed contact assembly in comparison to the arc-breaking plates, may be at the front wall of the insulating casing, thereby in an opposite position with respect to the fixed contact assembly of the switch pole. The arc-breaking plates of the arc chamber are thus located at subsequent positions between the terminal arc-breaking element and the rear wall of the insulating casing.

The terminal arc-breaking element may be arranged in proximal position to the contact region of the switch pole in comparison to said arc-breaking plates.

According to the disclosure, the terminal arc-breaking element includes a plate portion, which is arranged in parallel to the arc-breaking plates and has a first surface facing the arc-breaking plates, a second surface opposite to said first surface and at least a first through-hole.

The terminal arc-breaking element further includes a cover of electrically insulating material coating, at least partially, the second surface of said plate portion. Such a cover includes at least a second through hole in fluid-dynamic communication with the at least a first through-hole of said plate portion in such a way that hot gases or plasma can pass through said plate portion and said cover, during operation (in particular during an opening maneuver) of the switch pole.

Each second through hole of said cover may be aligned to a corresponding first through-hole of said first plate portion.

The one or more second through holes of said cover may have a narrower section compared to the one or more first through-holes of said first plate portion.

Said cover may include a single second through-hole aligned with a corresponding single first through-hole of said plate portion and having a narrower section compared to said first through-hole.

Said cover may be mechanically fixed to said plate portion.

Said cover conveniently may include one or more mounting portions fitting an upper edge of said first plate portion, which is in distal position from said contact region.

According to an aspect of the present disclosure, said terminal arc-breaking element further includes an elongated portion protruding from said plate portion and extending across said arc-extinguishing region, from said plate portion towards said fixed contact assembly.

Said elongated portion may protrude from said plate portion at a lower edge of said plate portion, which is in proximal position to said contact region.

Said elongated portion may have a first end joined to said plate portion and a second free end, which is curved towards said contact region.

The arrangement of a terminal arc-breaking element as defined above provides relevant advantages.

During an opening maneuver of the switching device, the terminal arc-breaking element catches and drives possible electric arcs formed between the electric contacts under separation towards a terminal portion of the arc chamber, where the above-mentioned plate portion is located. Electric arcs are thus urged to develop throughout the whole arc chamber, thereby involving substantially all the arc-breaking plates of this latter.

The path followed by said electric arcs during the opening maneuver is thus remarkably lengthened, which greatly favor the cooling of said electric arcs.

The arrangement of a cover on the plate portion of the terminal arc-breaking element allows this latter to direct possible electric arc towards the arc-breaking plates more efficiently.

On the other hand, the arrangement of through-holes (preferably aligned) at the plate portion and the cover of the terminal arc-breaking plate improves the fluid-dynamics in the arc chamber by making hot gases and plasma (generated by high energy ionization effects of air filling the switch pole) quickly flow away from the contact region of the switch pole, towards a front wall and a top wall of the insulating casing. Such a movement of the hot gases and plasma contributes to driving electric arcs throughout the arc chamber in such a way to move them away from the contact region and involve the arc-breaking elements of the arc chamber.

The holes provided in the plate portion and cover of the terminal arc-breaking element thus remarkably contribute to drive electric arcs away from the contact region and lengthen their path during an opening maneuver of the switching device.

Besides, the improved flow of hot gases from the contact region to the arc extinguishing region exerts a remarkable cooling action on the movable contacts of the switch pole.

According to example embodiments of the present disclosure, the insulating casing of the switch pole includes an insulating wall partially separating the contact region from the arc extinguishing region of the switch pole, in distal position from the fixed contact assembly.

Advantageously, the terminal arc-breaking element leans on said insulating wall, may be at the above-mentioned elongated portion. In this way, the insulating wall supports the terminal arc-breaking element, thereby favoring the arrangement of the arc chamber.

Said insulating wall may be integral with a front wall and opposite lateral walls of said insulating casing and extends from said front wall towards said fixed contact assembly.

The curved free end of the elongated portion of the terminal arc-breaking element of the arc chamber protrudes from said insulating wall in such a way to be exposed directly to the contact region.

BRIEF DESCRIPTION OF THE DRAWINGS

Further features and advantages of the present disclosure will be evident from the description of example but not exclusive embodiments of a switch pole, according to the present disclosure, shown by way of examples in the accompanying drawings, wherein.

DETAILED DESCRIPTION

Figure 1:
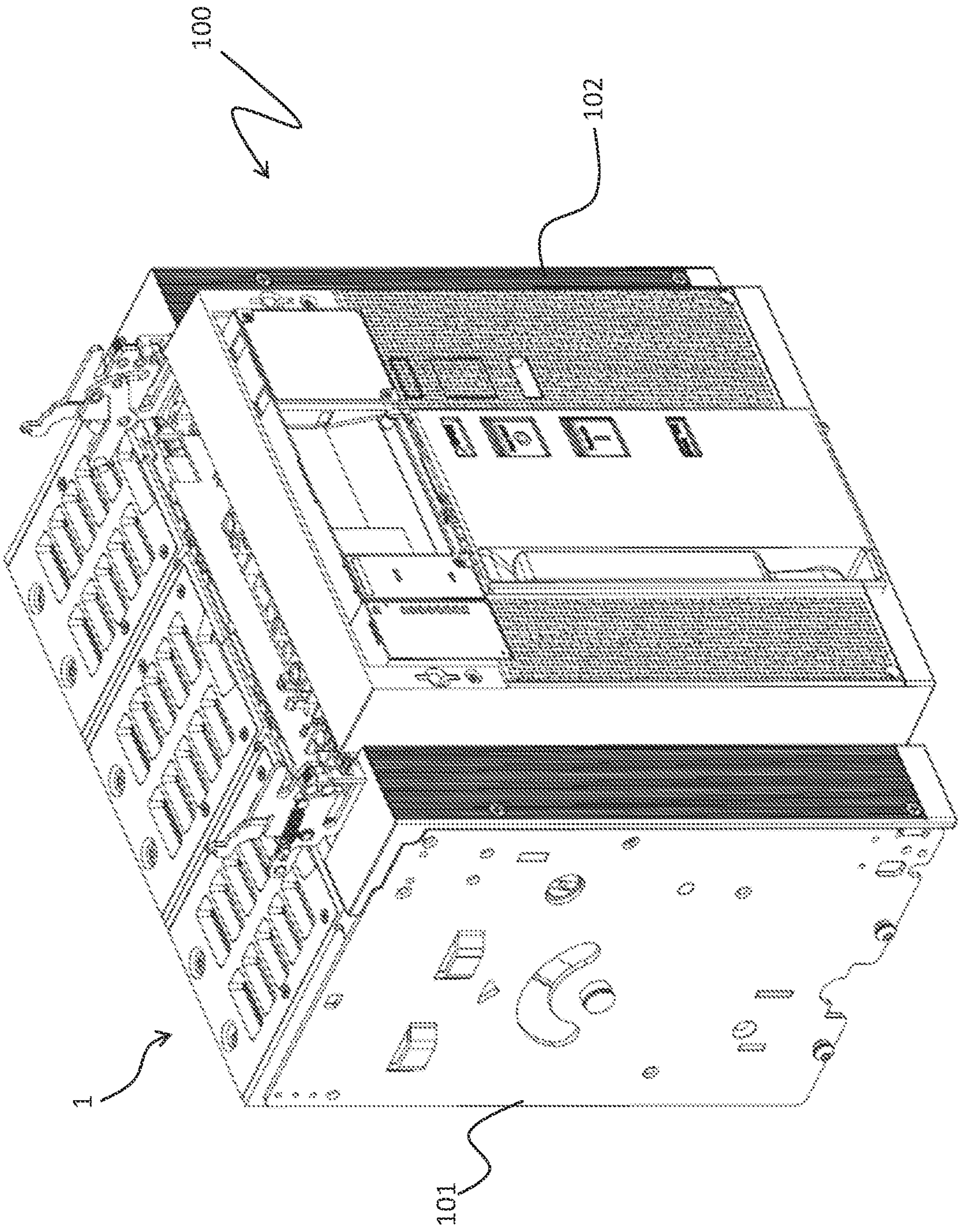
FIGS. 1 and 2 are schematic views of a low voltage switching device including a plurality of low voltage switch poles, according to the present disclosure.

With reference to the attached figures, the present disclosure relates to a switch pole 1 for a low voltage switching device 100, e.g., a circuit breaker, a disconnector, a contactor, or the like.

The switching device 100 is particularly adapted for use in AC low voltage electrical systems and it will be described with particular reference to these applications. However, in principle, it may be used also in electric systems of different type, e.g., in DC low voltage electrical systems.

For the purposes of the present disclosure, the term "low voltage" typically relates to operating voltages up to 1.5 kV AC and 2 kV DC.

The switching device 100 includes one or more switch poles 1, according to the disclosure.

The number of switch poles may vary, according to the needs. In the embodiments shown in FIGS. 1-2, the switching device 100 is of the three-phase type and it includes three switch poles. However, according to other embodiments of the disclosure (not shown), the switching device 100 may include a different number of switch poles depending on the number of electric phases of the electric circuit, in which it has to be installed.

Each switch pole 1 of the switching device 100 includes an insulating casing 2, which defines an internal volume including a contact region 3 and an arc extinguishing region 4.

In general, the contact region 3 is a portion of internal volume of the switch pole where the contact assemblies of the switch pole are arranged and operate. On the other hand, the arc-extinguishing region 4 is a portion of internal volume of the switch pole where there are arranged arc-quenching means designed to extinguish possible electric arcs arising between the electric contacts of the switch pole, during the opening maneuvers of the switching device 100.

As shown in the cited figures, the contact region 3 and an arc extinguishing region 4 are adjacent and are in fluid-dynamic communication one with another.

For the sake of clarity, it is specified that, within the scope of the present disclosure, the expression "in fluid-dynamic communication" referred to some parts or regions of the switch pole of the disclosure has to be intended with reference to an operating condition, in which a gas can flow between said parts or regions.

The arc extinguishing region 4 may be positioned at un upper level with respect to the contact region 3, i.e. in proximal position relative to a top side of this latter.

Figure 2:
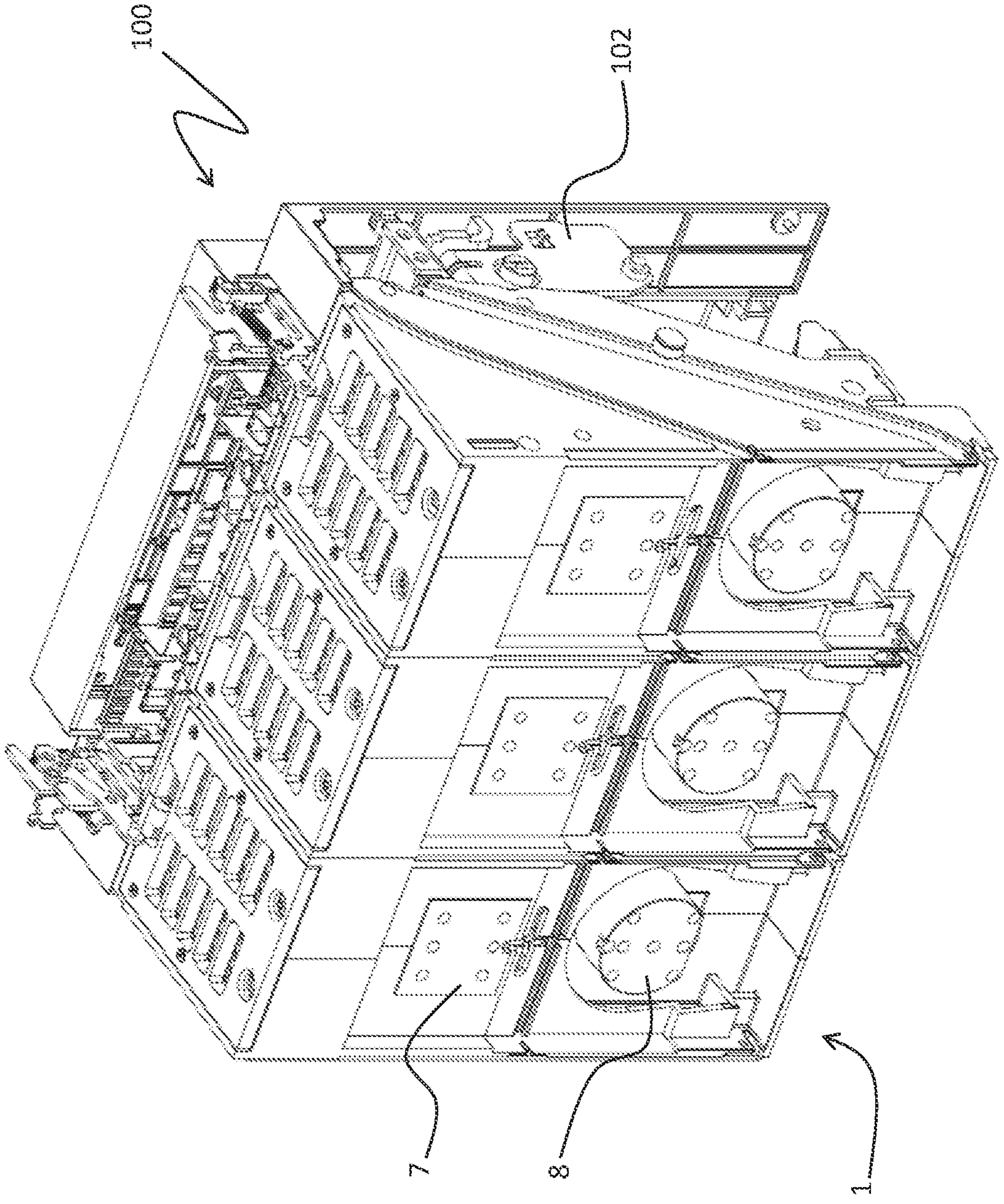

For the sake of clarity, it is specified that relative terms used in this disclosure, e.g., "front", "rear", "lateral", "upper", "lower", "top" and "bottom" relate to the switch pole 1 in its normal installation conditions, namely in the "vertical" installation shown in FIGS. 1-2.

The insulating casing 2 of the switch pole is shaped as a contoured box, with opposite first and second lateral walls 21, 22, opposite front and rear walls 23, 24 and opposite top and bottom walls 25, 26.

Figure 3:
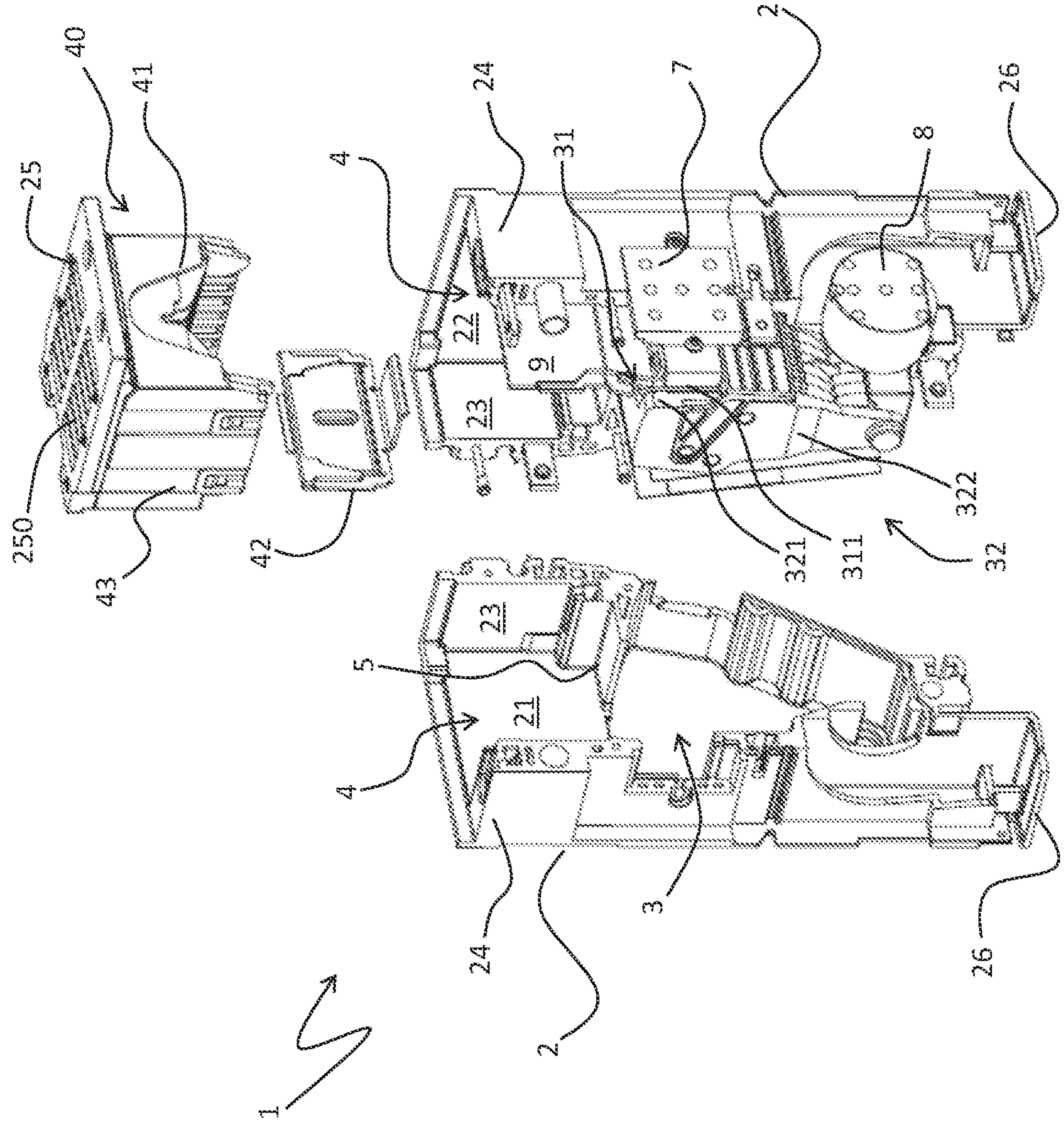
FIGS. 3-6 are schematic views of a switch pole according to the present disclosure.
Figure 4:
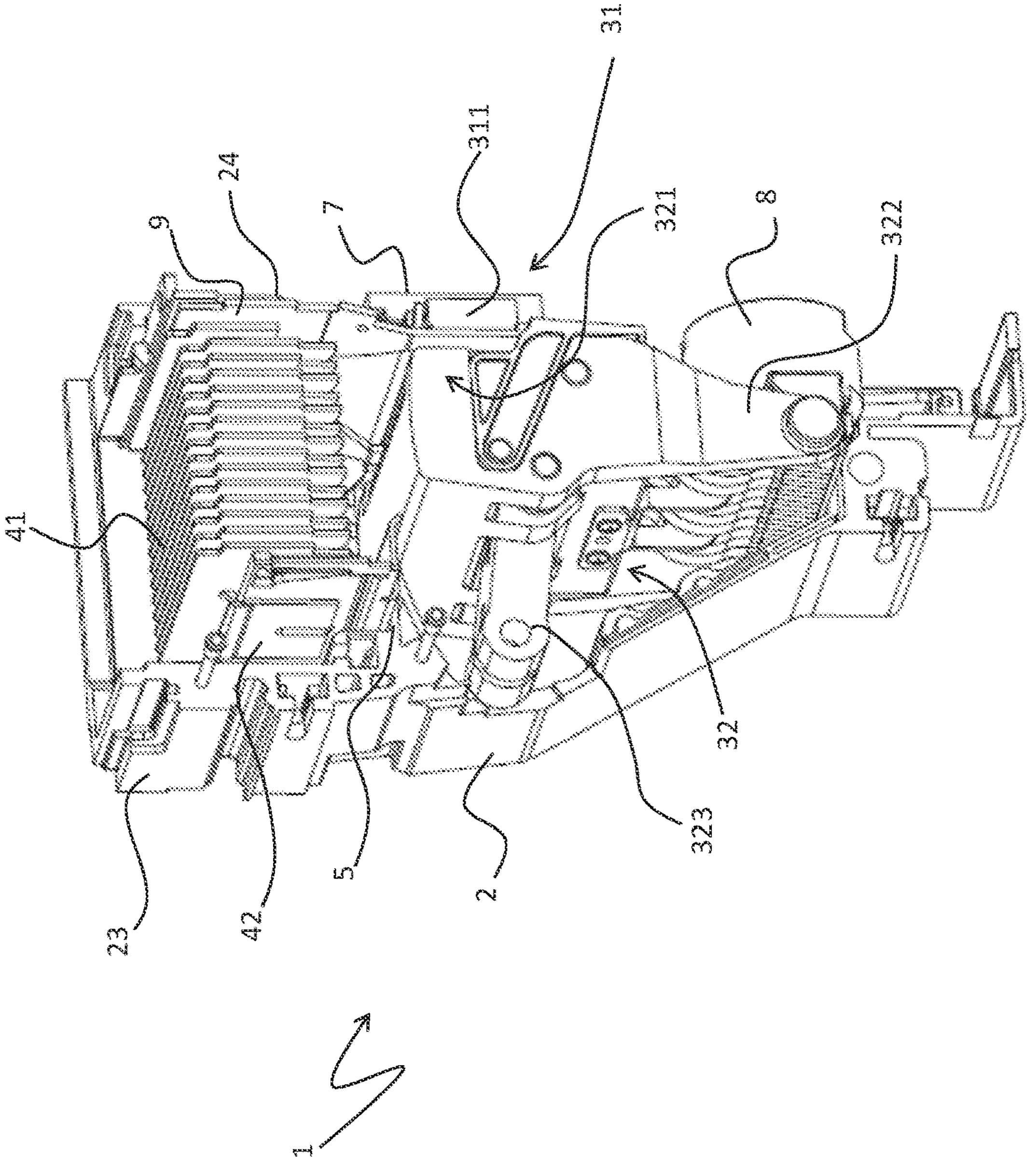
Figure 5:
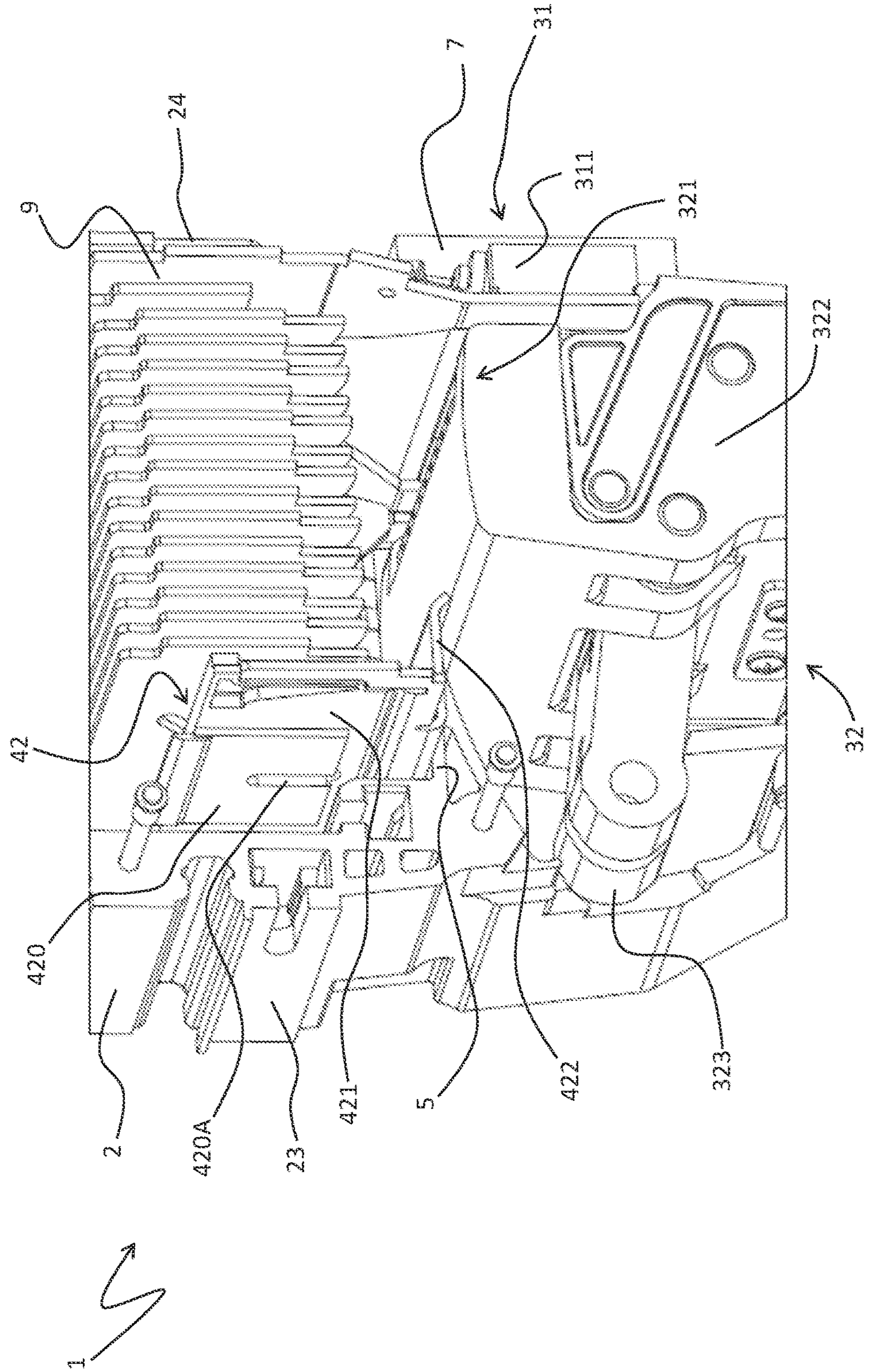

As shown in the attached figures (FIG. 3), the insulating casing 2 may include first and second half shells coupled to each other so as to form said insulating casing. In practice, a first half shell includes the first lateral wall 21, a portion of the front wall 23, a portion of the rear wall 24 and a portion of the bottom wall 26, while a second half shell includes the second lateral wall 22, a portion of the front wall 23, a portion of the rear wall 24, and a portion of the bottom wall 26.

According to these embodiments of the disclosure, the top wall 25 of the insulating casing 2 is fixed to an insulating enclosure 43 of another component 40 (the arc chamber) of the switch pole and it may be removably installed in the switch pole together with such a component.

However, according to other embodiments of the disclosure (not shown), the insulating casing 2 of the switch pole may be arranged differently. For example, the top wall of the insulating casing may be integral with other walls of the insulating casing or it may be self-standing so as to be removably couplable with other walls of the insulating casing.

The top wall 25 of the insulating casing 2 may be provided with a number of through openings 250 to allow the exit of hot gases from the internal space of the switch pole, in particular from the arc extinguishing region 4.

The insulating casing 2 is made of an electrically insulating material, e.g., a thermosetting or thermoplastic material.

The switch pole 1 includes a fixed contact assembly 31 and a movable contact assembly 32, which are positioned in the contact region 3 of the switch pole.

The fixed contact assembly 31 includes one or more fixed contacts 311, which may be formed by suitable conductive plates.

In the embodiments shown in the cited figures, the fixed contact assembly 31 includes a pair of fixed contacts 311 (conductive tips or plates), which may be positioned at the rear wall 24 of the insulating casing 2 of the switch pole. However, according to other embodiments of the disclosure (not shown), the fixed contact assembly 31 may include a different number of electric contacts.

In general, the fixed contact assembly 31 may be realized according to solutions of known type and it will be described hereinafter only with reference to the aspects of interest of the disclosure, for the sake of brevity.

The movable contact assembly 32 includes one or more movable contacts 321, which may be formed by suitable conductive fingers.

The movable contacts 321 can be mutually coupled or uncoupled to the fixed contacts 311. To this aim, the movable contact assembly 32 is reversibly movable between a first position (FIG. 7), in which the movable contacts 321 are coupled to the fixed contacts 311, and second position (FIG. 9), in which the movable contacts 321 are fully spaced from the fixed contacts 311.

The first position of the movable contacts 321 of each electric pole corresponds to a close condition of the switching device 100, in which electric currents are allowed to flow along the electric poles whereas the second position of the movable contacts 321 of each electric pole corresponds to an open condition of the switching device 100, in which electric currents along the electric poles are interrupted.

A transition of the movable contacts 321 of each electric pole from the above-mentioned first position to the above-mentioned second position constitute an opening maneuver of the switching device 100 whereas an opposite transition of the movable contacts 321 of each electric pole from the above-mentioned second position to the above-mentioned first position constitute a closing maneuver of the switching device 100.

In the embodiments shown in the cited figures, the movable contact assembly 32 includes a pair of movable contacts 321. However, according to other embodiments of the disclosure (not shown), the movable contact assembly may include a different number of electric contacts.

The movable contact assembly 32 includes a supporting structure 322 for supporting the electric contacts 321, which can conveniently rotate about a suitable rotation axis, so as to allow coupling/separation of the movable contacts 321 to or from the fixed contacts 311 of the fixed contact assembly 31.

The supporting structure 322 conveniently includes a connecting element 323, which protrudes outside the insulating casing 2 of the switch pole (may be from a suitable window in the front wall 23) for connection with a driving mechanism (not shown) designed to move the movable contact assembly 32 of each switch pole.

In general, the movable contact assembly 32 may be realized according to solutions of known type and it will be described hereinafter only with reference to the aspects of interest of the disclosure, for the sake of brevity.

Each switch pole 1 includes a first pole terminal 7 and a second pole terminal 8 that are electrically coupled with the fixed contacts 311 and the movable contacts 321 of the fixed contact assembly 31 and the movable contact assembly 32, respectively.

In operation, the pole terminals 7, 8 are electrically coupled with corresponding line conductors of an electric line. Such line conductors are, in turn, electrically connected to an electric power source (e.g., an electric power feeding or generation system or a section of electric grid) and to an electric load (e.g., an electric system or apparatus or a section of electric grid).

The pole terminals 7, 8 may be positioned at the rear wall 24 of the insulating casing 2 of the switch pole.

In general, the pole terminals 7, 8 may be realized according to solutions of known type and it will be described hereinafter only with reference to the aspects of interest of the disclosure, for the sake of brevity.

According to some embodiments of the disclosure (shown in the cited figures), the switch pole 1 includes an elongated conductive plate 9 (e.g., formed by a metal plate), which is electrically connected to the fixed contacts 311 of the fixed contact assembly 31.

The conductive plate 9 may extend from the fixed contacts 311 towards the arc extinguishing region 4 and it is arranged at the rear wall 24 of the insulating casing 2, thereby being right between the contact region 3 and the arc extinguishing region 4.

According to the disclosure, the switch pole 1 includes an arc chamber 40 positioned in the arc extinguishing region 4 of the switch pole, conveniently above the contact region 3.

The arc chamber 40 may include a plurality of arc-breaking elements 41, 42 designed to extinguish possible electric arcs raising between the electric contacts 311, 312 when these latter are separated during an opening maneuver of the switching device 100.

According to some embodiments (shown in the cited figures), the arc chamber 40 may be formed by a self-standing structure that can be removably installed in the corresponding switch pole. In this case, the arc chamber 40 may include an insulating enclosure 43 (made of an electrically insulating material, e.g., a thermosetting or thermoplastic material), which can be removably fixed to the insulating casing 2 of the switch pole. The arc-breaking elements 41, 42 are conveniently fixed to the insulating enclosure 43.

The top wall 25 of the insulating casing 2 may be fixed to the insulating casing 43 of the arc chamber 40. In this way, it can be installed or removed together with the arc chamber 40.

In the following, the arc chamber 40 will be described with reference to the above-illustrated embodiments of the disclosure for the sake of brevity only. Indeed, according to other embodiments of the disclosure (not shown), the arc chamber 40 may be simply formed by a sub-portion of the arc extinguishing region 4 of the switch pole, in which the arc-breaking elements 41, 42 are arranged, for example by fixing them to the insulating casing 2 through suitable supports.

The arc-breaking elements of the arc chamber 40 include a plurality of arc-breaking plates 41, which are arranged in parallel one to another, preferably along reference planes parallel to the front and rear walls 23, 24 of the insulating casing 2.

The arc-breaking plates 41 may be arranged at subsequent positions between the front and rear walls 23, 24 of the insulating casing 2, in particular at increasing distances from the fixed contact assembly 31.

The arc-breaking plates 41 may be arranged at a given distance from the contact region 3, so that there is a gap region 4A of the arc extinguishing region 4, which separates the contact region 3 and the arc-breaking plates 41 (FIGS. 6-9).

The arc-breaking plates 41 may be formed by contoured metallic or ceramic plates, which can have different dimensions and shapes according to the needs.

According to the embodiments shown in the cited figures, the arc-breaking plates 41 may be fixed to the insulating enclosure 43 of the arc chamber.

The arc-breaking elements of the arc chamber 40 include a terminal arc-breaking element 42, which is arranged in distal position from the fixed contact assembly 31 compared to the arc-breaking plates 41.

The terminal arc-breaking element 42 may be arranged at the front wall 23 of the insulating casing 2, thereby in an opposite position with respect to the rear wall 24, where the fixed contact assembly 31 is arranged.

The terminal arc-breaking element 42 may be arranged in proximal position to the contact region 3 compared to the arc-breaking plates 41, in practice at level of the gap region 4A of the of the arc extinguishing region 4.

In general, as it is evident from the cited figures, the terminal arc-breaking element 42 delimits the arc chamber 40 at the front wall 23 of the insulating casing 2. The arc-breaking plates 41 are thus arranged at subsequent positions between the terminal arc-braking element and the rear wall 24 of the insulating casing 2.

According to the disclosure, the terminal arc-breaking element 24 is an assembly formed by a folded metallic or ceramic structure 421, 422 and a cover 420 made of electrically insulating material.

The terminal arc-breaking element 42 includes a plate portion 421, which is arranged parallel to the arc-breaking plates 41 of the arc chamber.

The plate portion 421 of the terminal arc-breaking element 42 is arranged in distal position from the fixed contact assembly 31 compared to the arc-breaking plates 41.

Figure 6:
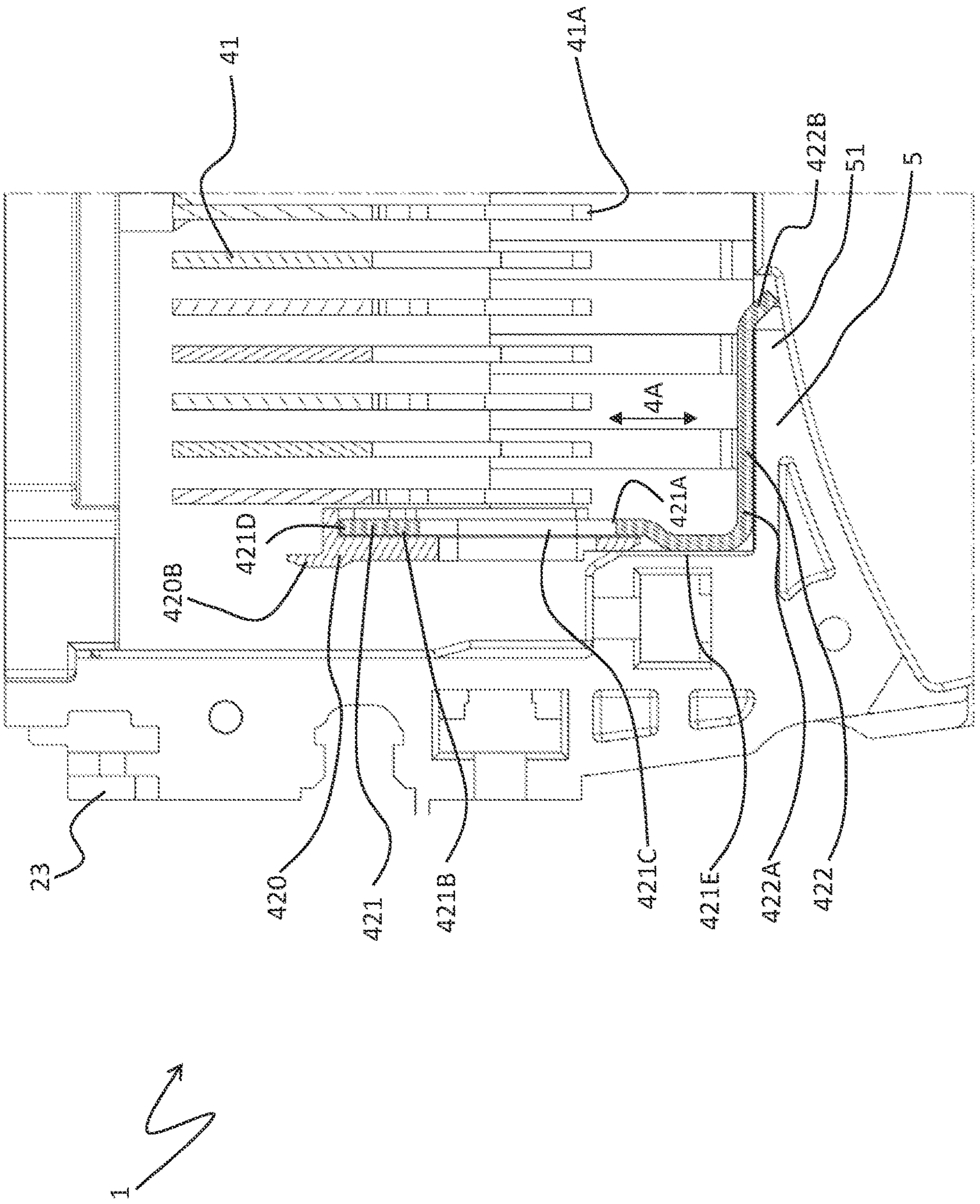

The plate portion 421 of the terminal arc-breaking element 42 may be arranged in a proximal position to the contact region 3 compared to the arc-breaking plates 41. The plate portion 421 is thus located at a lower level with respect to the other metallic plates 41. In practice, the distance between a lower edge 421E of the plate portion 421 the contact region 3 is very shorter than the distance between a lower edge 41A of a generic arc-breaking plate 41 and the contact region 3 (FIG. 6).

A lower edge 421A of the plate portion 421 is located at a gap region 4A of the arc extinguishing region 4, which separates the contact region 3 and the arc-breaking plates 41, more particularly at the border between the arc contact region 3 and the arc extinguishing region 4 (FIGS. 6-9).

In principle, the shape of the plate portion 421 may be any, according to the needs.

Figure 12:
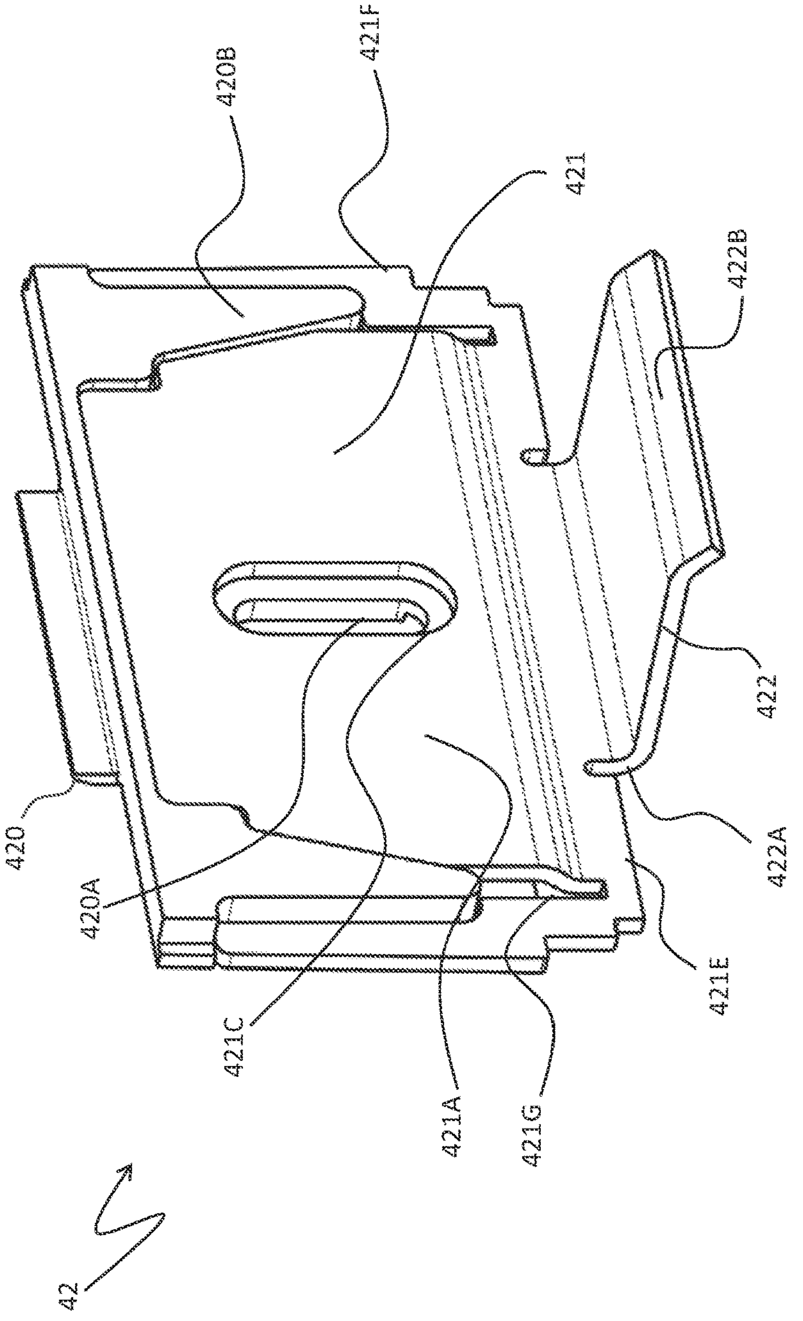
FIGS. 12-14 are schematic views of a terminal arc-breaking element of the switch pole, according to the present disclosure.
Figure 13:
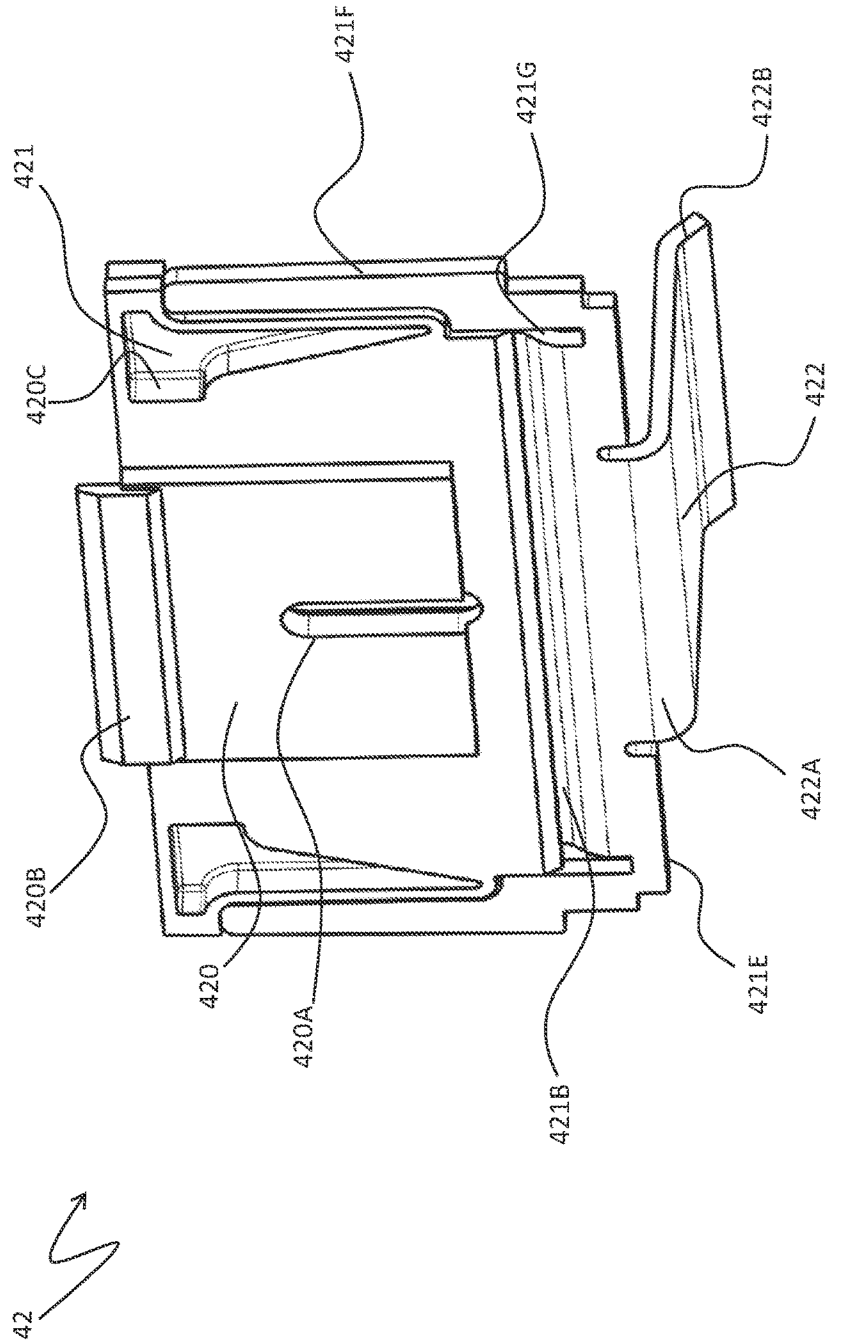
Figure 14:
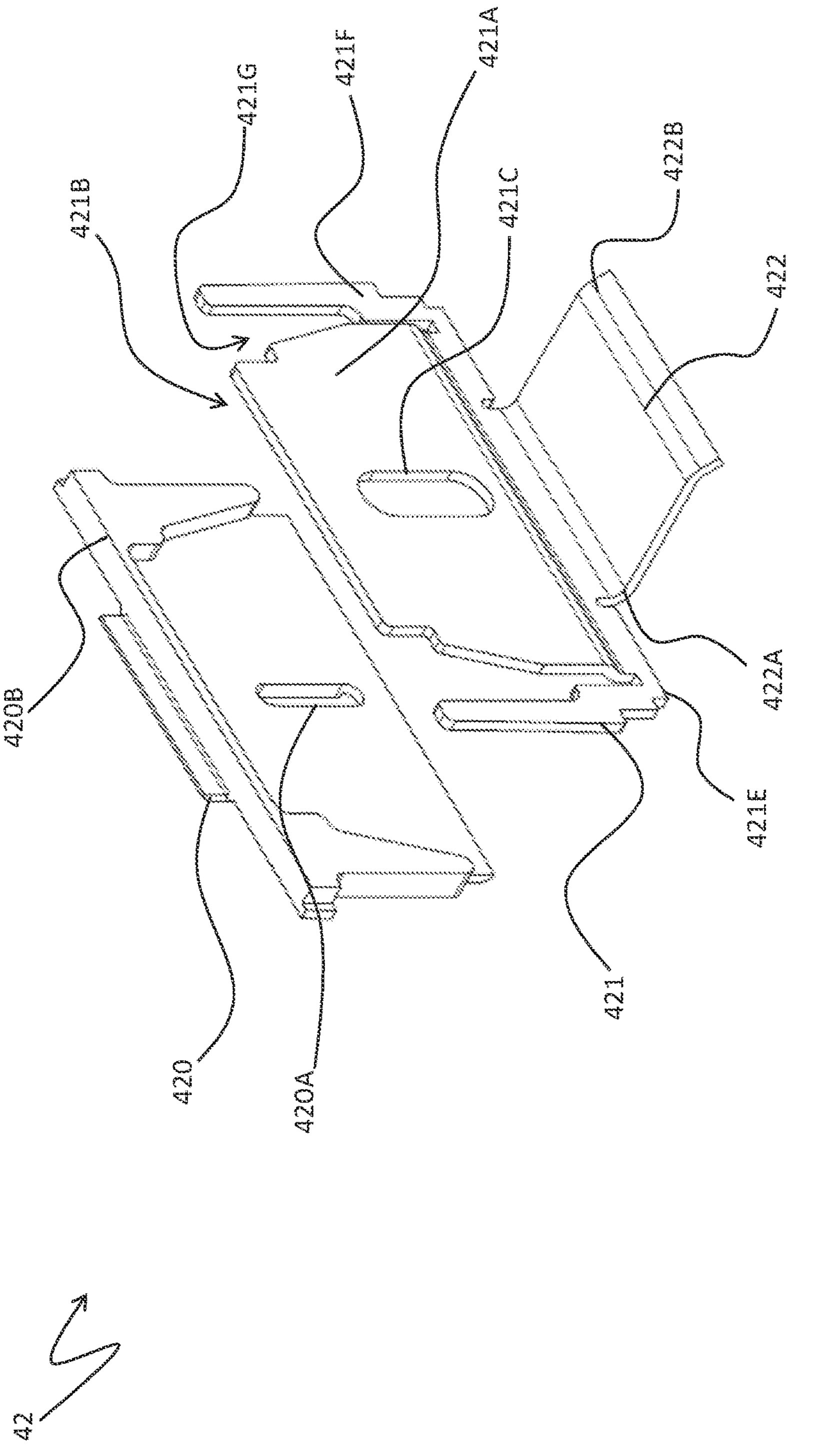

The plate portion 421 has a rectangular shape, with opposite lower and upper edges 421D, 421E and opposite lateral edges 421F (FIGS. 12-14).

The lower and upper edges 421D, 421E of the plate portion 421 are arranged perpendicular to the lateral walls 21, 22 of the insulating casing 2 and are located in a proximal position and in a distal position relative to the contact region 3 of the switch pole, respectively.

The lateral edges 421F of the plate portion 421 are instead arranged perpendicular to the top and bottom walls 25, 26 of the insulating casing 2.

The lateral edges 421F of the plate portion 421 may have a stepped profile to favor the assembly of the arc-breaking element 42 on the insulating enclosure 43.

The plate portion 421 has a first surface 421A, which faces the arc-breaking plates 41 (more particularly a surface portion of the last arc-breaking plate 41 counted from the fixed contact assembly), and a second surface 421B, which is opposite to the first surface 421B (and thereby oriented towards the front wall 23 of the insulating casing 2).

The plate portion 421 has at least a first through-hole 421C passing through the thickness of said plate portion between the first and second surfaces 421A, 421B.

In the embodiment shown in the cited figures, the plate portion 421 includes a single first through-hole 421C as shown in the cited figures. According to alternative embodiments, however, the plate portion 421 may include a plurality of first through-holes, for example a pair of first through-holes arranged in parallel.

In the embodiment shown in the cited figures, the first through-hole 421C has a slotted shape aligned along an axis perpendicular to the top and bottom walls 25, 26 of the insulating casing 2. In principle, however, the shape of the one or more first through-holes of the plate portion 421 may be any, according to the needs.

The plate portion 421 may include one or more first cutouts 421G in addition to the one or more first through-holes 421C (FIGS. 12-14). As it will better emerge from the following, these additional cutouts are basically arranged to favor the assembly of the cover 420 to the plate portion 421.

The plate portion 422 may be formed by a plate of conductive material, e.g., a metallic plate or a conductive ceramic plate.

The terminal arc-breaking element 42 further may include an elongated portion 422 protruding from the plate portion 421 (may be at the lower edge 421E of this latter) and extending from the plate portion 421 towards the fixed contact assembly 31, across the arc-extinguishing region 4.

Advantageously, the elongated portion 422 of the arc-breaking element 42 is capable of catching and driving possible electric arcs formed between the electric contacts 311, 321 under separation towards a terminal portion of the arc chamber 4. Electric arcs are thus urged to form throughout the whole arc chamber 4, thereby involving all the arc-breaking plates 41.

As shown in the cited figures, the elongated portion 422 may be located at a lower level with respect to the arc-breaking plates 41, namely at a gap region 4A of the arc extinguishing region 4, which separates the contact region 3 and the arc-breaking plates 41, more particularly at the border between the arc contact region 3 and the arc extinguishing region 4 (FIGS. 6-9).

The elongated portion 422 may be positioned transversally (may be perpendicularly) to a number of arc-breaking plates 41, which are located in proximity of the plate portion 421.

The elongated portion 422 may be formed by a metallic or ceramic lamina. In principle, however, the shape of the elongated portion 422 may be any, according to the needs.

The elongated portion 422 may be centered with respect to the plate portion 421 and it has a lower width compared to this latter.

The elongated portion 422 may have a first end 422A joined to the plate portion 421 and a second opposite free end 422B, opposite to said first end, which is curved towards the contact region 3 (FIGS. 6-9).

As it will be more apparent from the following, this solution further helps catching of possible electric arcs between the electric contacts by the elongated portion 422.

A further essential aspect of the present disclosure consists in that the terminal arc-breaking element 42 includes a cover 420 of electrically insulating material (may be having gasifying capabilities), which coats, at least partially, the second surface 421B of the plate portion 421.

The cover 420 may be in contact with the second surface 421B of the plate portion 421 in such a way to coat at least a portion of said second surface with a layer of electrically insulating material.

The cover 420 may have a smaller size compared to the second surface 421B of the plate portion 421 in such a way to coat only a portion of said second surface.

The arrangement of a cover 420, which coats at least partially the plate portion 421 at the second surface 421B oriented in an opposite direction relative to the arc-breaking plates 41, is particularly advantageous as it allows directing more efficiently electric arcs captured by the folded structure 421, 422 towards the arc-breaking plates 41.

According to the disclosure, the cover 420 includes at least a second through-hole 420A passing through the thickness of said cover.

The one or more second through-holes 420A of the cover 420 are in fluid-dynamic communication with the one or more first through-hole 421C of the plate portion 421 in such a way that in such a way that hot gases or plasma can pass through the plate portion 421 and the cover 420 during operation (in particular during an opening maneuver) of the switch pole.

Each second through-hole 420C of the cover 420 may be aligned with a corresponding first through-hole 421C of the plate portion 421.

The arrangement of communicating through-holes 421C, 420A at the plate portion 421 and cover 420 of the terminal arc-breaking element improves the fluid dynamics inside the arc chamber by making hot gases (generated by high energy ionization effects of air filling the switch pole) flow away from the contact region 3 of the switch pole, towards the front wall 23 and, subsequently, the top wall 25 of the insulating casing 2. In practice, the region of the switch pole between the arc-breaking element 42 and the front wall 23 can be advantageously exploited as a sort of "chimney" conveying the hot gases towards the top wall 25 of the insulating casing 2. Such a movement of the hot gas contributes to drive electric arcs throughout the arc chamber 40 in such a way to move them away from the contact region 3 and involve the arc-breaking plates 41 of the arc chamber. The path of the electric arcs may thus be lengthened more efficiently during an opening maneuver of the switching device.

Besides, the improved flow of hot gases from the contact region to the arc extinguishing region exerts a remarkable cooling action on the movable contacts of the switch pole.

In the embodiment shown in the cited figures, the cover 420 includes a single second through-hole 420A as shown in the cited figures. According to alternative embodiments, the cover 420 may include a different number of second through-holes. However, the number of second through-holes 420A of the cover 420 may correspond to the number of first through-holes 421C of the plate portion 421.

In the embodiment shown in the cited figures, the second through-hole 420A has a slotted shape aligned along an axis perpendicular to the top and bottom walls 25, 26 of the insulating casing 2. In principle, the shape of the one or more first through-holes of the plate portion 421 may be any, according to the needs. However, the shape of the second through-holes 420A of the cover 420 corresponds to the shape of the first through-holes 421C of the plate portion 421.

According to example embodiments of the disclosure, the one or more second through holes 420A of the cover 420 have a narrower section compared to the one or more first through-holes 421C of the first plate portion 421.

In particular, each second through hole 420A of the cover 420 has, may be, a narrower section compared to the corresponding aligned first through-hole 421C of the first plate portion 421.

This solution is quite advantageous as the different section size of the corresponding first and second through-holes 421C, 420A causes a pressure increase of the hot gases passing through the plate portion 421 and the cover 420, which favors their flow towards the front wall 23 and the top wall 25 of the insulating casing 2.

In the embodiment shown in the cited figures, the cover 420 includes a single second through-hole 420A aligned to a corresponding single first through-hole 421C of the first plate portion 421 and having a narrower section compared to this latter.

In general, the cover 420 and the plate portion 421 are made in a single piece and they cannot be separated for stability and mounting reasons. In alternative, however, the cover 420 can mechanically fixed to the plate portion 421 through suitable fixing means of known type.

The cover 420 may include one or more mounting portions 420B fitting the upper edge 421D of the first plate portion 421 in such a way the cover 420 can be fixed to the plate portion.

The mounting portions 420B may include a pair of symmetric wings climbing over the upper edge 421D of the first plate portion 421 and extending along the opposite lateral edges 421F at the first surface 421A to fit the first cutouts 421G of the plate portion 421 (FIGS. 13-14). In principle, however, other solutions to fix the cover 420 on the plate portion 421 may be employed, according to the needs.

The cover 420 may include one or more second cutouts 420C in addition to the one or more second through-holes 420A (FIG. 13). These additional cutouts are basically arranged to favor the assembly of the cover 420 to the plate portion 421.

According to some embodiments of the disclosure (shown in the cited figures), the insulating casing 2 includes an insulating wall 5 partially separating the contact region 3 from the arc extinguishing region 4 in distal position from the fixed contact assembly 31.

Figure 7:
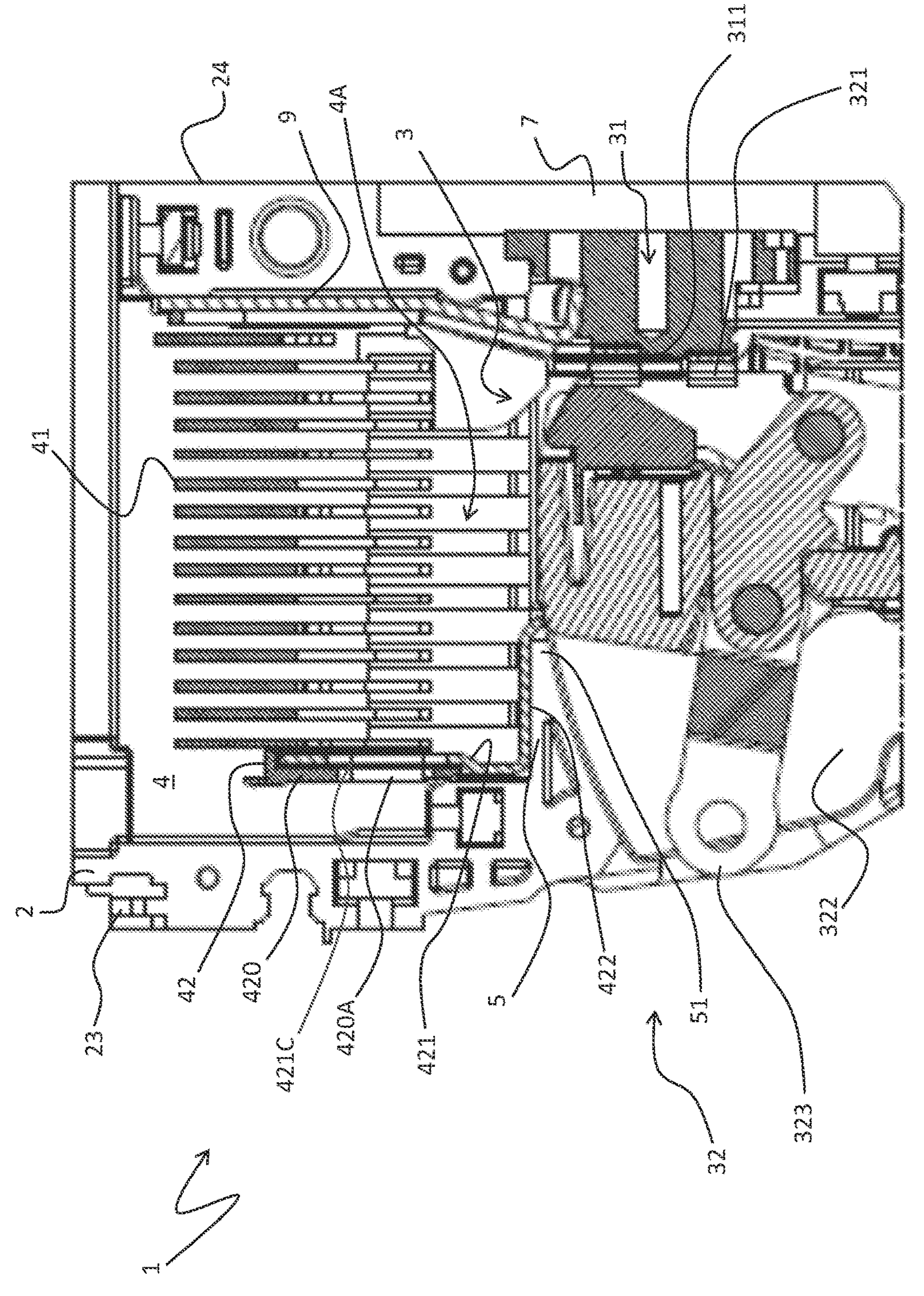
FIGS. 7-9 are schematic views the switch pole according to the present disclosure, in different operating conditions.
Figure 8:
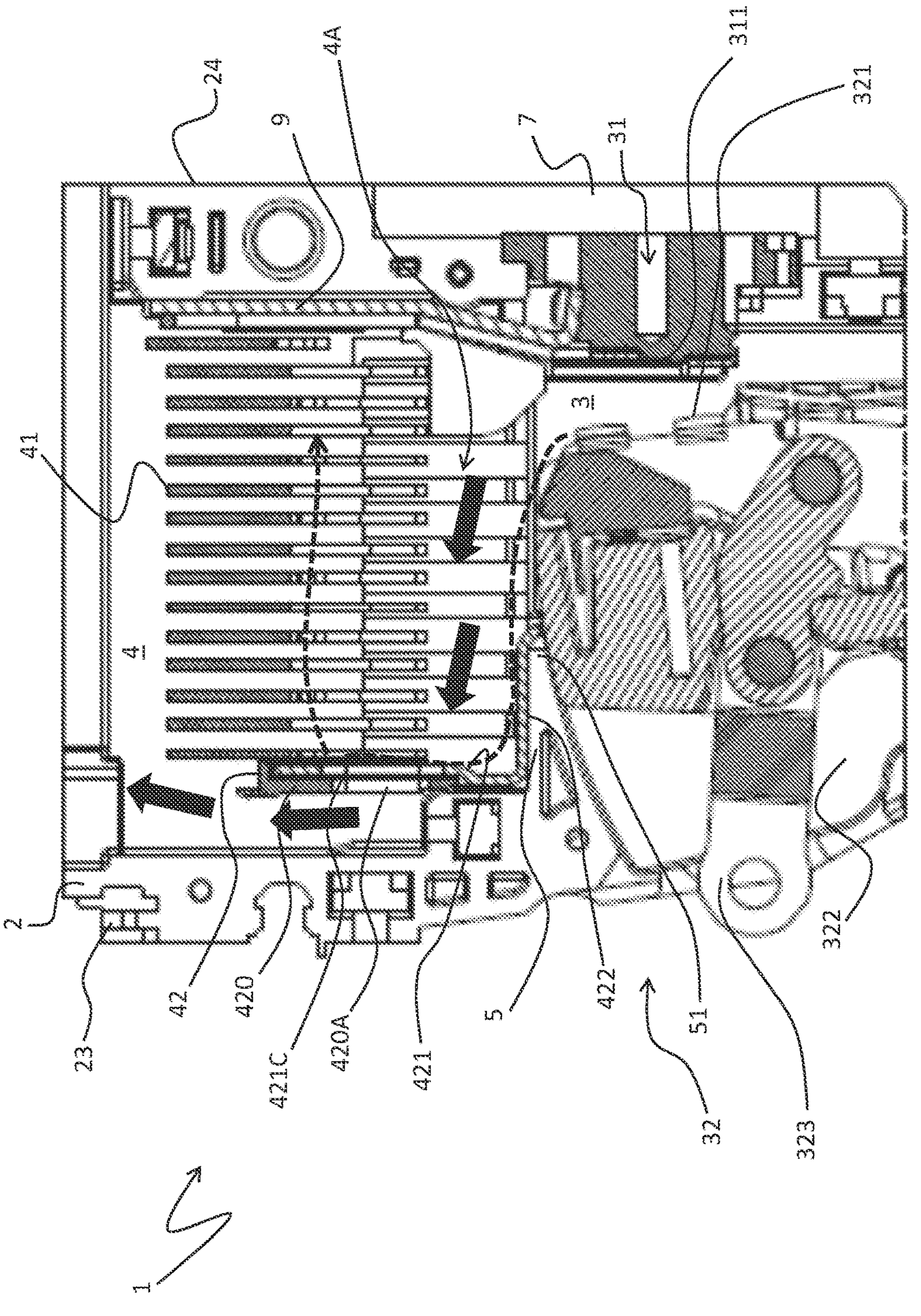

The insulating wall 5 may have a free end 51 in correspondence of a middle portion of the contact region 3 (FIGS. 6-8).

Conveniently, the insulating wall 5 defines the boundary between the contact region 3 and the arc extinguishing region 4 at the front wall 23 of the insulating casing 2. In this way, the contact region 3 and the arc extinguishing region 4 are in direct communication with each other in the region near the fixed contact assembly 31 (i.e., at the rear wall 24 of the insulating casing 2). Conversely, in the region near the front wall 23 of the insulating casing 2 (i.e., opposite to the fixed contact assembly 31), the contact region 3 and the arc extinguishing region 4 are isolated from each other by the insulating wall 5. This solution greatly helps to reduce possible "jumps" of the electric arcs towards other conductive parts of the switch pole, which are located outside the arc-extinguishing region 4.

The insulating wall 5 may be integral with the front wall 23 and the opposite lateral walls 21, 22 of the insulating casing 2 and it extends from the front wall 23 towards the fixed contact assembly 31 and the rear wall 24.

The terminal arc-breaking element 42 may lean on the insulating wall 5, thereby being supported by this latter. This solution greatly favors the arrangement of the terminal arc-breaking element 42 and, more, generally of the whole arc chamber, in particular when this latter can be removably installed.

The insulating wall 51 may bear the elongated portion 422 and, possibly, the lower edge 421E of the plate portion 421 of the terminal arc-breaking element 42 (FIG. 6).

The curved free end 422B of the elongated portion 422 may protrude slightly from the free end of 51 the insulating wall 5 in such a way to be directly exposed to the contact region 3 of the switch pole. In this way, the catching action exerted by the elongated portion 422 is not limited by the presence of the insulating wall 5.

According to some embodiments of the disclosure (not shown), a channel may be provided in the insulating wall 5. Such a channel is possibly designed to put the contact region 3 into communication with the arc extinguishing region 4 in such a way to allow the passage of hot gas from the contact region 3 to the arc extinguishing region 4, thereby conveying the hot gases towards a terminal portion of the arc chamber 40 (where the plate portion 421 of the terminal arc-breaking element 42 is positioned), in proximity of the front wall 23 of the insulating casing 2. Obviously, this solution further improves the fluid-dynamics of hot gases towards a terminal portion of the arc chamber.

Figure 9:
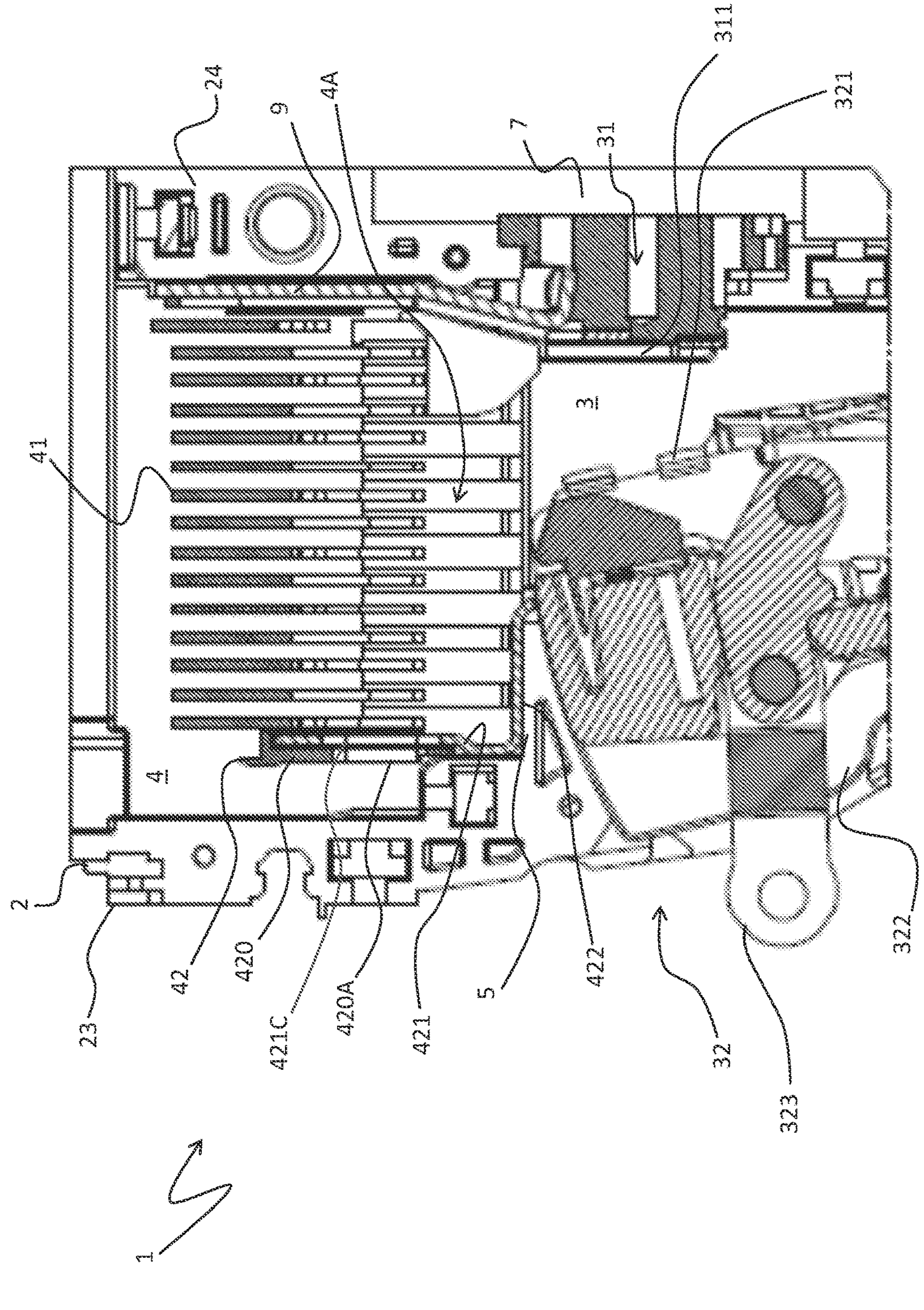
Figure 10:
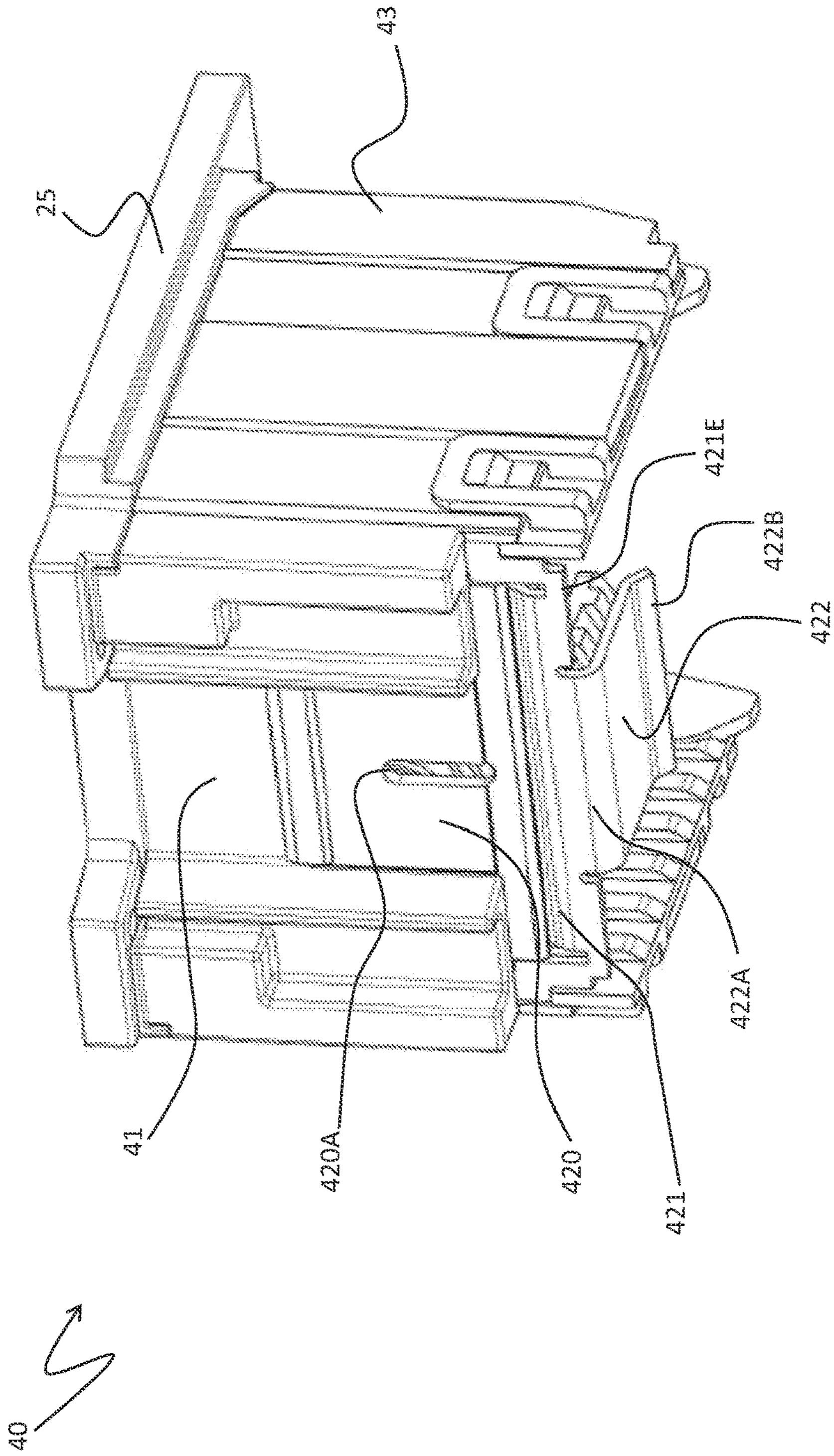
FIGS. 10 and 11 are schematic views of an arc chamber of the switch pole according to the present disclosure.
Figure 11:
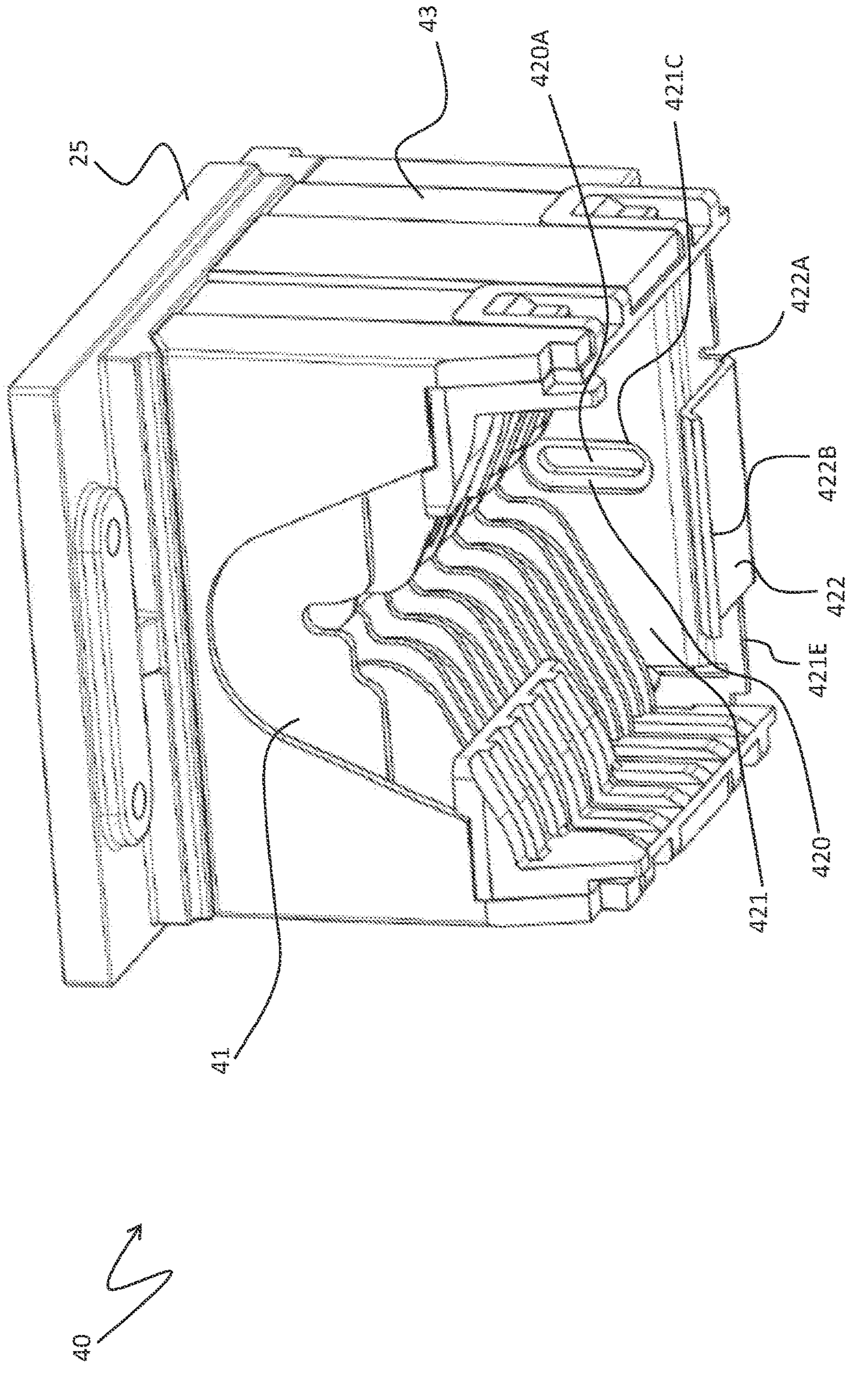

FIGS. 7-9 show the behavior of the switch pole 1 during an opening maneuver of the switching device 100.

FIG. 7 shows the switch pole with the movable contacts 321 coupled to the fixed contacts 311 (closed condition of the switching device). In this situation, a current can flow along the switch pole between the pole terminals 7, 8 and no electric arcs develop between the electric contacts 311, 321.

During an opening maneuver, the movable contacts 321 are moved away from the fixed contacts 311.

As soon as the movable contacts 321 separate from the fixed contacts 311, a difference of voltage potential is established between said electric contacts (at any time, the movable contacts 321 may have a positive voltage polarity while the fixed contacts 311 may have a negative voltage polarity, or vice-versa). Since the dielectric distance between the electric contacts 311, 321 is quite short, electric arcs initially develop between said electric contacts and in an initial part of the arc chamber, i.e., in proximity of the fixed contact assembly 31.

The high energy ionization effects of the air (dielectric medium) between the electric contacts leads to the generation of high-pressure hot gases.

As soon as the movable contacts 321 are sufficiently spaced apart from the fixed contacts 311 (FIG. 8), electric arcs are caught by the elongated portion 422 of the terminal arc-breaking element 42. In fact, the elongated portion 422 has its free end 422B located in proximity of contact region 3, so that the movable contacts 321 pass at a very short distance from the elongated portion 422 while moving away from the fixed contacts 311.

Electric arcs are thus forced to pass through the plate portion 421, the arc-breaking plates 41 and the conductive element 9 in order to go from the movable contacts 321 to the fixed contacts 311 (the path of the electric arcs is schematically represented by the dotted arrow of FIG. 8). It is evidenced that such a driving action of the electric arcs is favored by the presence of the cover 420 that prevents or reduce possible current leakages or deviations of the electric arcs towards different metal parts of the switch pole.

At the same time, by virtue of the through-holes 421C and 420A in the plate portion 421 and in the cover 420 of the terminal arc-breaking element 42, hot gases are conveyed to the front wall 23 and, subsequently, to the top wall 25 of the insulating gases 2, which additionally favors the stripping the electric arcs towards the arc-breaking elements 41, 42 (the path of the hot gases is schematically represented by the solid arrows of FIG. 8).

Finally, when the movable contacts 321 reach a position corresponding to an open condition of the switching device, electric arcs may be finally quenched (FIG. 9) or continue their quenching process through the full extension of the portion arc-breaking elements 41, 42.

As is clear from the above description, the technical solutions adopted for the low voltage switch pole, according to the present disclosure, allow the proposed aims and the objects to be achieved.

By virtue of the particular structure of the terminal arc-breaking element 42, in the switch pole, according to the present disclosure, it is possible to obtain an optimal utilization of the arc-breaking elements of the arc chamber, which are progressively involved in the arcing phenomena during an opening maneuver of the switching device.

In particular, substantially all arc breaking plates 41 of the arc chamber 40 are involved in the quenching action of electric arcs, thereby allowing a uniform and efficient utilization of the arc chamber. Less mechanical and thermal stresses are generated into the arc chamber with a consequent prolonged lifetime of this latter.

At the same time, by virtue of the through-holes 421C and 420A in the plate portion 421 and in the cover 420 of the terminal arc-breaking element 42, the fluid dynamics of the hot gases is greatly improved, which further contributes to strip the electric arcs throughout the arc chamber and cool the movable contacts of the switch pole.

The arrangement of an insulating wall at the boundary between the contact region and the arc-extinguishing region remarkably reduces the possibility for electric arcs to strike towards other conductive components of the switch pole, outside the arc-extinguishing region.

The switch pole of the disclosure has a relatively simple and compact structure, relatively easy to manufacture at industrial level, at competitive costs compared to the currently available solutions on the market.

As mentioned above, the present disclosure relates also to a low voltage switching device 100 including at least one low voltage switch pole 1 as previously described.

With reference to FIGS. 1 and 2, a three-pole low voltage circuit breaker 100 including three low voltage switch poles 1 (i.e., circuit breaker poles) is shown.

In this embodiment, the insulating casing 2 of each switch pole 1 is made of two half shells, and the poles 1 are positioned side by side in a supporting a containing structure having rigid flanks 102 as well as a cover 101.

From suitable windows (not shown) in the front wall 23 of the insulating casing 2 of each switch pole 1, the connecting elements 323 protrude outside for connection with a driving mechanism (not shown).

The general structure of such low voltage circuit breaker 100 is, in many aspects, well known in the art and therefore it will not be described here in more details, for the sake of brevity.

What is claimed is:

1. A switch pole for a low voltage switching device comprising:

an insulating casing defining an internal space with a contact region and an arc extinguishing region of the switch pole;

a fixed contact assembly and a movable contact assembly positioned in the contact region and including, respectively, one or more fixed contacts and one or more movable contacts, which can be mutually coupled or uncoupled; and an arc chamber positioned in the arc extinguishing region and comprising a plurality of arc-breaking elements, wherein the plurality of arc-breaking elements comprise a plurality of parallel arc-breaking plates and a terminal arc-breaking element, the terminal arc-breaking element arranged in distal position from the fixed contact assembly compared to the plurality of parallel arc-breaking plates, wherein the terminal arc-breaking element comprises a plate portion arranged in parallel to the plurality of parallel arc-breaking plates and having a first surface facing the plurality of parallel arc-breaking plates, a second surface opposite to the first surface, and at least a first through-hole, wherein the terminal arc-breaking element comprises a cover of electrically insulating material coating, at least partially, the second surface of the plate portion, and wherein the cover comprises at least a second through-hole in fluid-dynamic communication with the at least the first through-hole of the plate portion in such a way that hot gases or plasma can pass through the plate portion and the cover, during operation of the switch pole.

2. The switch pole according to claim 1, wherein each of the at least the second through-hole of the cover is aligned to a corresponding first through-hole of the plate portion.

3. The switch pole according claim 1, wherein the at least the second through-hole of the cover has a narrower section compared to the at least the first through-hole of the plate portion.

4. The switch pole according claim 1, wherein the cover comprises a single second through-hole aligned with a corresponding single first through-hole of the plate portion and having a narrower section compared to the first through-hole.

5. The switch pole according to claim 1, wherein the cover comprises one or more mounting portions fitting an upper edge of the plate portion, which is in distal position from the contact region in order to fix mechanically the cover to the plate portion.

6. The switch pole according to claim 1, wherein the terminal arc-breaking element comprises an elongated portion protruding from the plate portion and extending across the arc-extinguishing region from the plate portion towards the fixed contact assembly.

7. The switch pole according to claim 6, wherein the elongated portion protrudes from the plate portion at a lower edge of the plate portion, which is in proximal position to the contact region.

8. The switch pole according to claim 7, wherein the elongated portion has a first end joined to the plate portion and a second free end, which is curved towards the contact region.

9. The switch pole according to claim 8, wherein:

the insulating casing comprises an insulating wall partially separating the contact region from the arc extinguishing region in distal position from the fixed contact assembly, the terminal arc-breaking element leaning on the insulating wall, and the second curved free end of the elongated portion protrudes from the insulating wall, so as to be exposed directly to the contact region.

10. The switch pole according to claim 6, wherein the elongated portion has a first end joined to the plate portion and a second free end, which is curved towards the contact region.

11. The switch pole according to claim 8, wherein:

the insulating casing comprises an insulating wall partially separating the contact region from the arc extinguishing region in distal position from the fixed contact assembly, the terminal arc-breaking element leaning on the insulating wall, and the second curved free end of the elongated portion protrudes from the insulating wall, so as to be exposed directly to the contact region.

12. The switch pole according to claim 1, wherein the insulating casing has opposite front and rear walls, wherein the terminal arc-breaking element is arranged at the front wall, wherein the fixed contact assembly is arranged at the rear wall, and wherein the plurality of parallel arc-breaking plates are arranged at subsequent positions between the terminal arc-breaking element and the rear wall.

13. The switch pole according to claim 1, wherein the terminal arc-breaking element is arranged in proximal position to the contact region compared to the plurality of parallel arc-breaking plates.

14. The switch pole according to claim 1, wherein the arc chamber comprises an insulating enclosure that can be removably fixed to the insulating casing, the plurality of arc-breaking elements is fixed to the insulating enclosure.

15. The switch pole according to claim 1, wherein the insulating casing comprises an insulating wall partially separating the contact region from the arc extinguishing region in distal position from the fixed contact assembly, the terminal arc-breaking element leaning on the insulating wall.

16. A low voltage switching device comprising at least a switch pole according to claim 1.

* * * * *